United States Patent
Jeon

(10) Patent No.: US 6,744,903 B1
(45) Date of Patent: Jun. 1, 2004

(54) MULTIPLE DAMPING DEVICE OF SPEAKER SYSTEM FOR VIDEO DISPLAY EQUIPMENT

(75) Inventor: Chang Wook Jeon, Kyongsangbuk-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/465,796

(22) Filed: Dec. 17, 1999

(30) Foreign Application Priority Data

Apr. 15, 1999 (KR) .......................... 13376/1999

(51) Int. Cl.[7] .............................. H04R 25/00
(52) U.S. Cl. .................. 381/388; 381/333; 381/386; 381/354; 361/679; 361/681
(58) Field of Search .................. 381/306, 333, 381/386, 388, 353, 354; 361/681–683

(56) References Cited

U.S. PATENT DOCUMENTS

| | | | |
|---|---|---|---|
| 5,048,089 A | | 9/1991 | Moore .................. 381/87 |
| 5,568,357 A | * | 10/1996 | Kochis et al. |
| 5,629,503 A | | 5/1997 | Thomasen .................. 181/199 |
| 5,640,461 A | * | 6/1997 | Ebert |
| 5,689,574 A | * | 11/1997 | Heirich |
| 5,881,989 A | * | 3/1999 | Obrien |
| 5,956,412 A | * | 9/1999 | Park |
| 5,970,161 A | * | 10/1999 | Takashima et al. |
| 6,173,064 B1 | * | 1/2001 | Anagnos |
| 6,233,140 B1 | * | 5/2001 | Cummings et al. |
| 6,275,595 B1 | * | 8/2001 | Lundgren et al. |

FOREIGN PATENT DOCUMENTS

| | | | |
|---|---|---|---|
| GB | 2302233 | | 1/1997 |
| GB | 2303992 | | 3/1997 |
| GB | 2307136 | | 5/1997 |
| GB | 2302233 A | * | 8/1997 |
| GB | 2349036 A | | 10/2000 |
| JP | 61-166680 | | 10/1986 |
| JP | 1178951 | | 7/1989 |
| JP | 63-114489 | | 3/1990 |
| JP | 5049082 | | 2/1993 |
| JP | 5207577 | | 8/1993 |
| JP | 8-163679 | | 6/1996 |
| JP | 9298787 | | 11/1997 |
| JP | 10066179 | | 3/1998 |
| WO | WO 95/01078 | | 1/1995 |

* cited by examiner

Primary Examiner—Curtis Kuntz
Assistant Examiner—Dionne N. Harvey
(74) Attorney, Agent, or Firm—Fleshner & Kim, LLP

(57) ABSTRACT

Disclosed is a multiple damping device of a speaker system for a video display equipment which is capable of having an improved multiple damping structure in the speaker system to thereby achieve a low howling and a high quality of sound. The multiple damping device of the speaker system includes: a cover frame united-type speaker, a back cover assembled at the back portion of the cover frame united-type speaker and installing a damping member fitting portion, at the top and bottom portions thereof, respectively, and a multiple damping part adapted to be installed between the cover frame united-type speaker and a cabinet to thereby cut the transmission of the vibration generated upon the operation of the speaker system to the cabinet.

33 Claims, 12 Drawing Sheets

MULTIPLE DAMPING DEVICE OF SPEAKER SYSTEM FOR VIDEO DISPLAY EQUIPMENT

BACKGROUND OF THE INVENTION

1. Field of the Invention

The present invention relates to a speaker system for a video display equipment, and more particularly, to a multiple damping device of a speaker system for a video display equipment which is capable of having an improved multiple damping structure in the speaker system to thereby achieve a low howling and a high quality of sound.

2. Discussion of Related Art

Generally, a video display equipment such as a computer monitor where a speaker system is embedded is designed to install the speaker system in the space between the outside wall of a Braun tube and the inside wall of a cabinet adapted for surrounding the Braun tube, as shown in FIG. 1. It can be therefore understood that the dimension of the speaker system depends upon the size of the width of the installation space thereof.

In addition, the dimension of the speaker system defines the short-diameter of a speaker as well as the ratio of the short-diameter to the long-diameter thereof.

As known, the ratio of the short-diameter to the long-diameter of the speaker has a serious relevancy to the quality of sound of the speaker. Under the conditions where other requirements are same, the speaker system can accomplish a high quality of sound when the ratio of the short-diameter to the long-diameter thereof is 1:1.

In other words, the speaker system can accomplish the high quality of sound, in the state where a gasket and cone paper constituting the speaker take a geometrically regular round shape.

Now, an explanation of the construction of a conventional speaker system for a video display equipment will be discussed with reference to FIGS. 1 to 3.

FIG. 2 is an exploded perspective view illustrating the speaker system of FIG. 1 and a damping device thereof, and FIG. 3 is a perspective view illustrating the assembled state of FIG. 2.

As shown in FIGS. 1 and 2, the conventional track type speaker system for the video display equipment includes: a cover frame united-type speaker 1 having a cover frame 101 and a speaker 100 for generating sound as integrated with each other; a back cover 2 assembled at the back portion of the cover frame united-type speaker 1 and installing a damping member fitting portion 200 at the top and bottom portions thereof, respectively; and a damping member 3 adapted to be inserted into a damping member fitting hole 201 of the damping member fitting portion to couple the cover frame united-type speaker 1 and the back cover 2 on a cabinet 4 and for damping the vibration generated upon the operation of the speaker and transmitted to the cabinet 4.

At this time, the speaker 100 is comprised of a gasket 102, a ring-shaped edge 103 attached on the inside of the gasket, and cone paper 104 attached on the inside of the edge 103.

On the other hand, the damping member 3 is comprised of a hollow cylinder type of body portion 300 having a plurality of cutting grooves 301 on the circumferential surface thereof, a flange portion 302 formed in a radial direction on the one end where the plurality of cutting grooves 301 of the body portion 300 are not formed, and protrusions 304 formed in a radial direction on the other end where the plurality of cutting grooves 301 of the body portion 300 are formed.

Under the above construction, an explanation of the assembling process and operation of the damping device of the conventional speaker system will be given.

Firstly, in the state where the cover frame united-type speaker 1 has been assembled with the back cover 2, the damping member 3 is, as shown in FIG. 2, inserted into the damping member fitting hole 201 of the damping member fitting portion 200 formed on the top and bottom ends of the back cover 2, respectively.

At this time, after the body portion 300 of the damping member 3 is completely inserted into the damping member fitting hole 201, the damping member 3 is restored to its original shape by means of an elastic force thereof. As a result, the protrusions 304, which are formed on the other end of the body portion 300 at which the cutting grooves 301 are formed, are positioned on the back edge of the damping member fitting portion 200 to thereby prevent the deviation of the damping member 3.

Thereby, after the body portion 300 of the damping member 3 mounted on the speaker 100 passes through a speaker system fitting boss 400 formed on the cabinet 4, the speaker system fitting boss 400 is fastened with a washer based screw 6.

The flange portion 302 of the damping member 3 serves to prevent the direct contact of a positioning rib 401 with the damping member fitting portion 200.

Under the assembled state as above, on the other hand, the conventional damping device is intended to cut the vibration generated upon the operation of the speaker system by means of the material characteristic and geometrical structure of the damping member 3, whereby it can eliminate screen flickering phenomenon on the video display equipment.

However, since the conventional speaker system adapted for the video display equipment implements the vibration damping operation only at one time, there occurs a problem that it fails to fully damp the vibration transmitted to the cabinet 4.

If a great amount of vibration not damped by means of the damping member 3 is transmitted to the cabinet 4, therefore, it is finally transmitted to the Braun tube to produce the resonance of a shadow mask installed on the inside of the Braun tube, thereby generating the flickering on the screen.

In other words, in case of generating the flickering due to the insufficient damping result, the speaker system can not raise sound pressure over a predetermined output value and enlarge frequency bandwidth at a low pass.

In conclusion, the conventional speaker system fails to increase the wattage of the speaker because of the incomplete damping result and particularly, exhibits a serious flickering on the screen at the frequency band under about 200 Hz. As a result, it can not lower the frequency band to a low sound to thereby degrade the quality of sound, which of course renders the quality of the speaker system substantially deteriorated.

SUMMARY OF THE INVENTION

Accordingly, the present invention is directed to a multiple damping device of a speaker system for a video display equipment that substantially obviates one or more of the problems due to limitations and disadvantages of the related arts.

An object of the invention is to provide a multiple damping device of a speaker system for a video display equipment which is capable of passing the vibration generated upon the operation of the speaker system through a multiple damping path to thereby prevent the screen flickering in the video display equipment caused due to the vibration transmitted to a cabinet, whereby the speaker system can produce a high wattage output and ensure the extension of the frequency band at a low pass.

To accomplish this and other objects of the present invention, there is provided a multiple damping device of a speaker system for a video display equipment having a cover frame united-type speaker for generating sound, a back cover assembled at the back portion of the cover frame united-type speaker and installing a damping member fitting portion at the top and bottom portions thereof, respectively, and a damping member adapted to be inserted into a damping member fitting hole to couple the cover frame united-type speaker and the back cover on a cabinet and for damping the vibration generated upon the operation of the speaker and transmitted to the cabinet, the multiple-damping device including: a multiple damping part adapted to be installed between the cover frame united-type speaker and the cabinet to thereby cut the transmission of the vibration generated upon the operation of the speaker system to the cabinet.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the drawings.

DETAILED DESCRIPTION OF PREFERRED EMBODIMENT

Reference will now be made in detail to the preferred embodiments of the present invention, examples of which are illustrated in the accompanying drawings.

Figure 1:
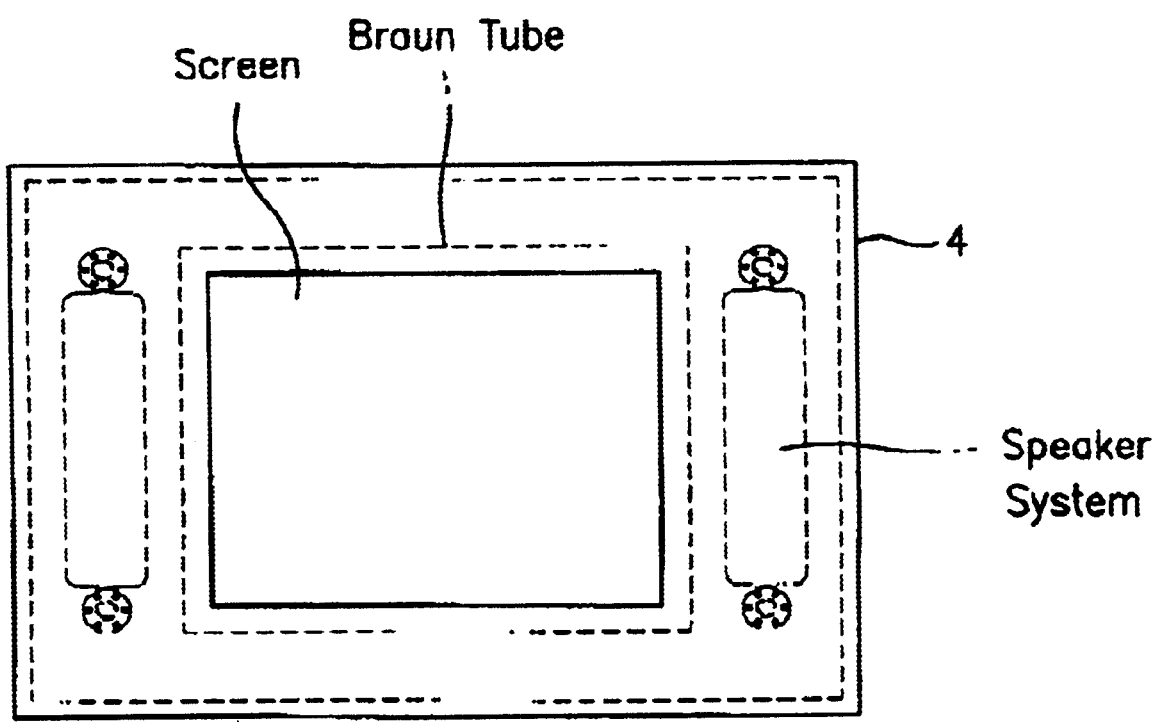
FIG. 1 is a schematic exemplary view illustrating the installation position of a conventional speaker system in a video display equipment.
Figure 2:
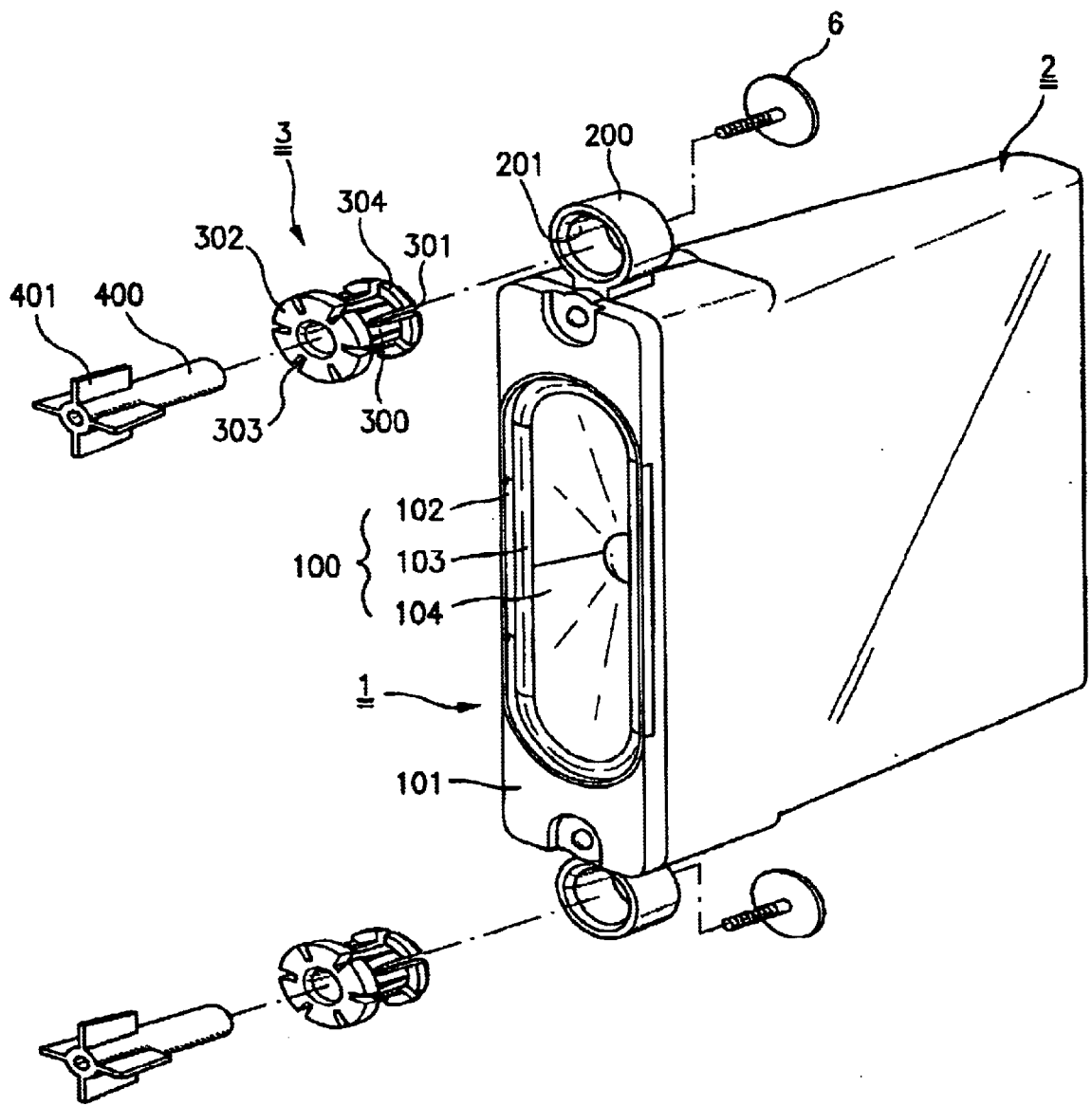
FIG. 2 is an exploded perspective view illustrating the speaker system of FIG. 1 and a damping device thereof.
Figure 3:
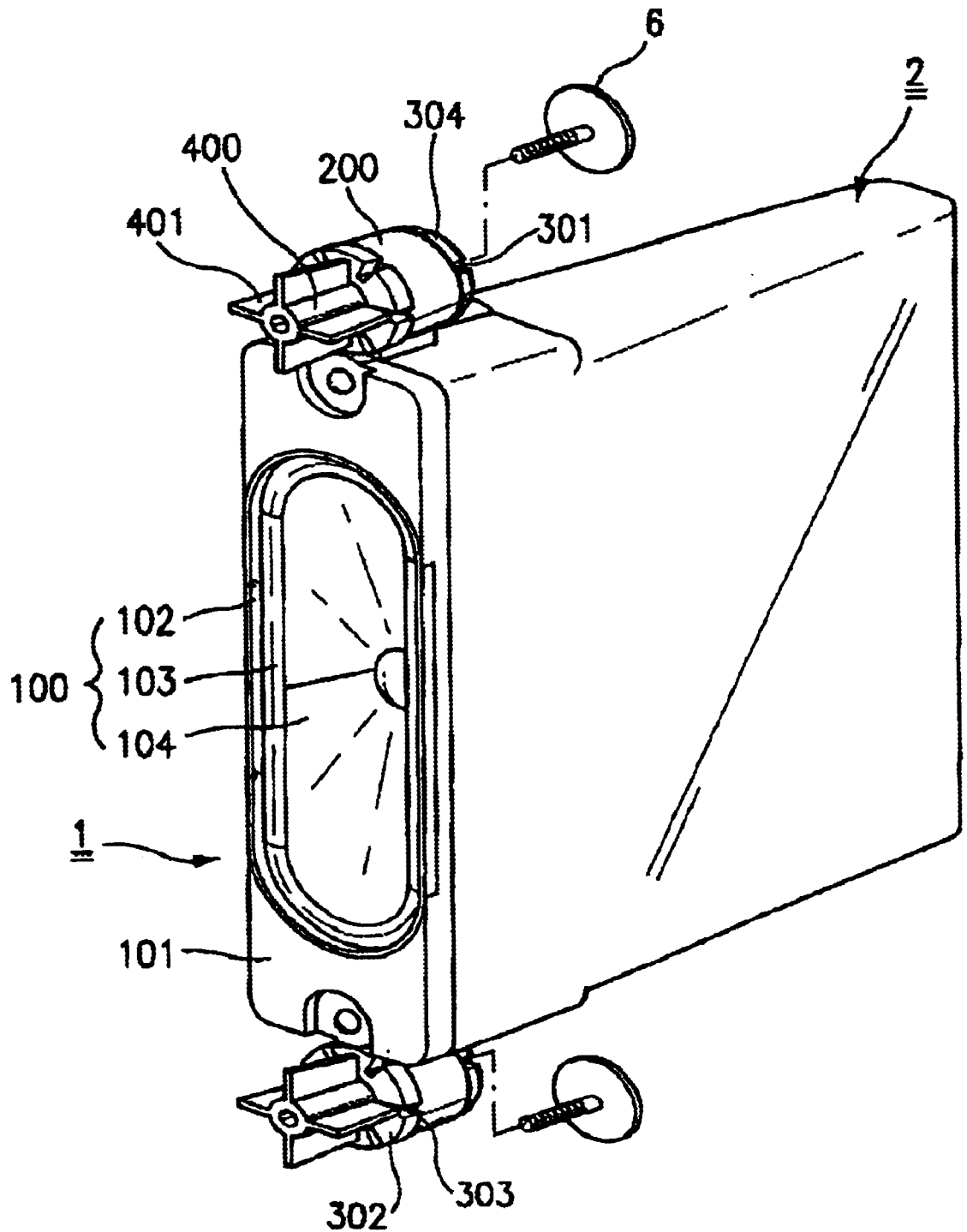
FIG. 3 is a perspective view illustrating the assembled state of FIG. 2.
Figure 4:
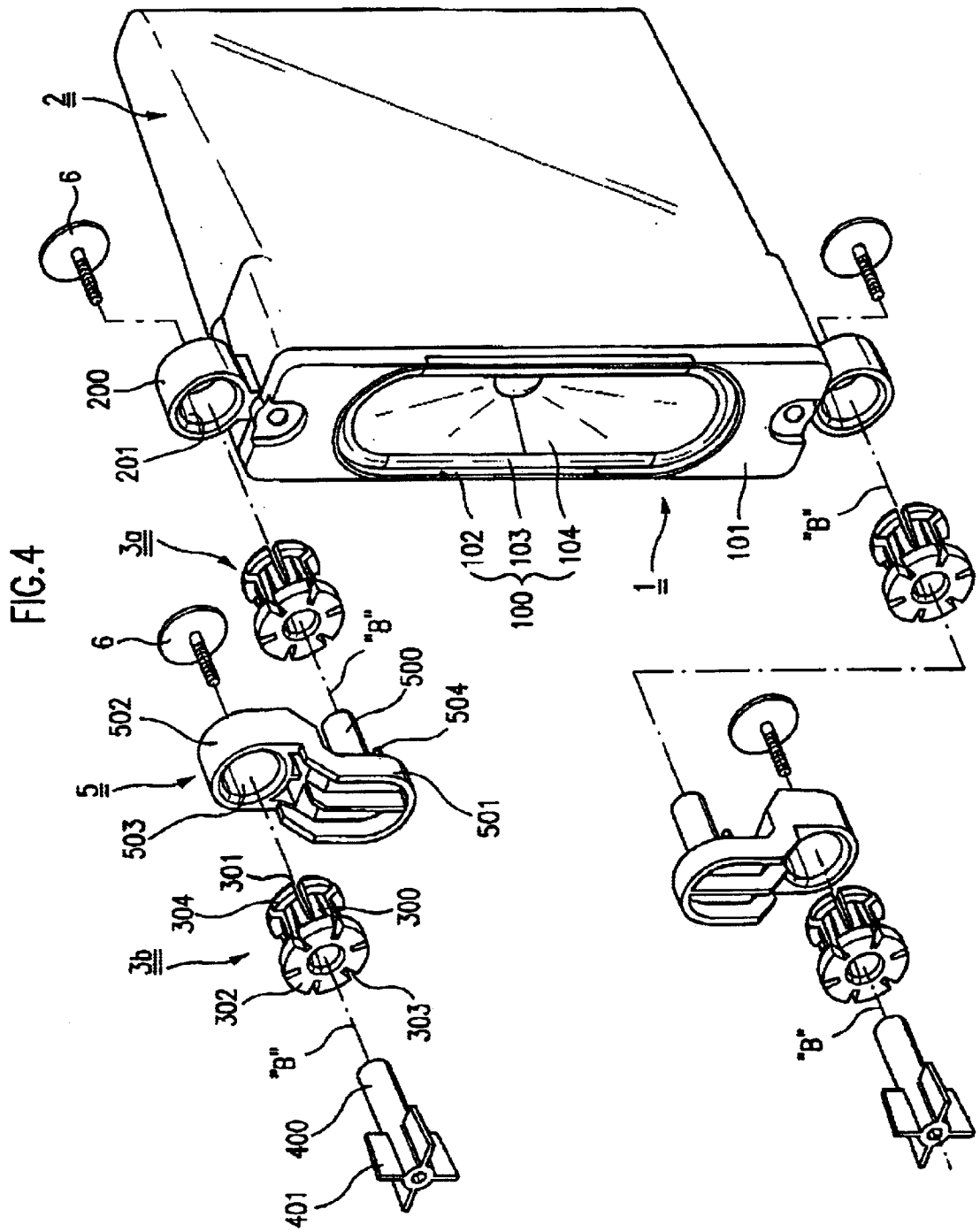
FIG. 4 is an exploded perspective view illustrating a speaker system for a video display equipment having a double damping structure according to a first embodiment of the present invention.
Figure 5:
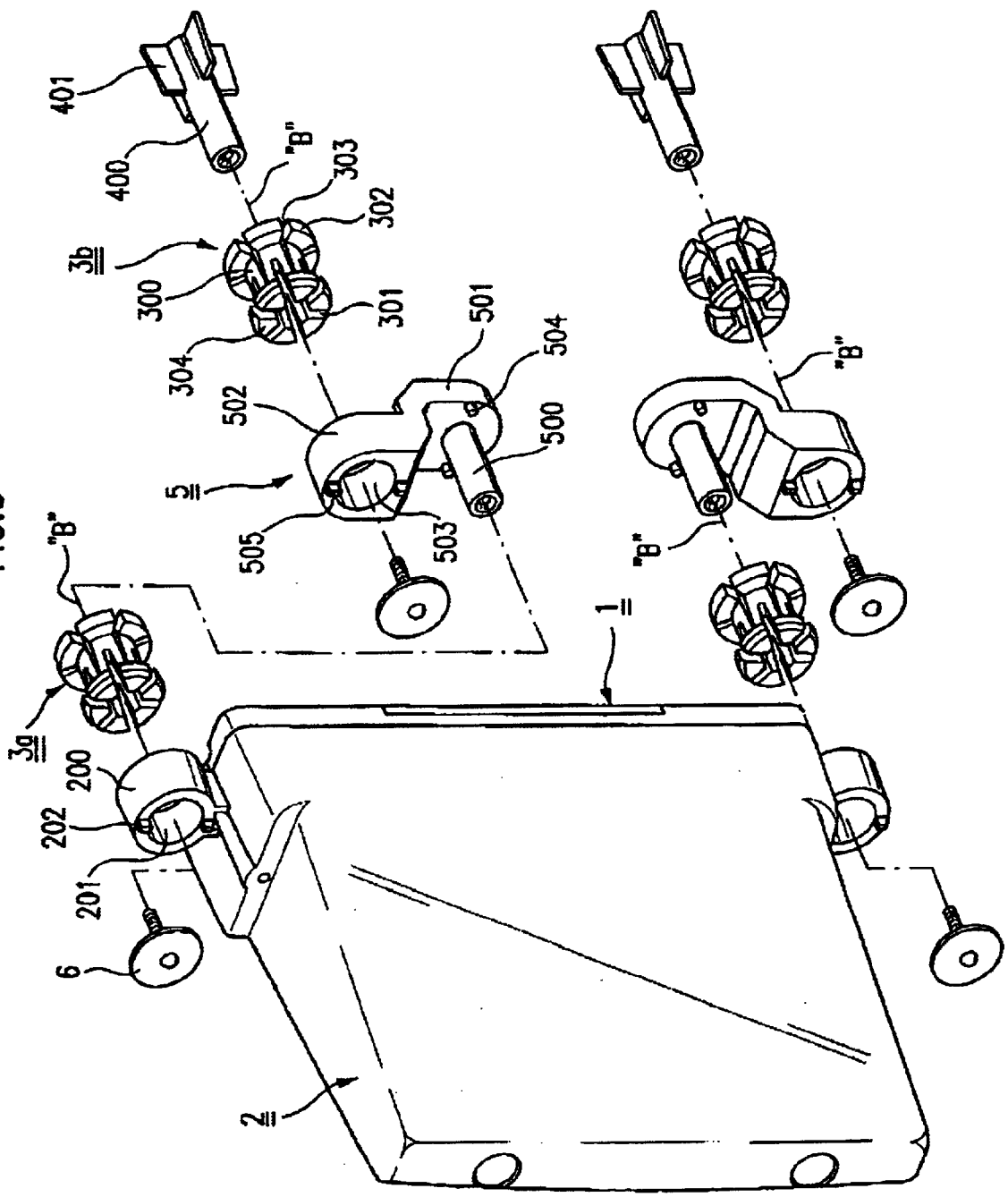
FIG. 5 is an exploded perspective view in the another direction of FIG. 4.
Figure 6:
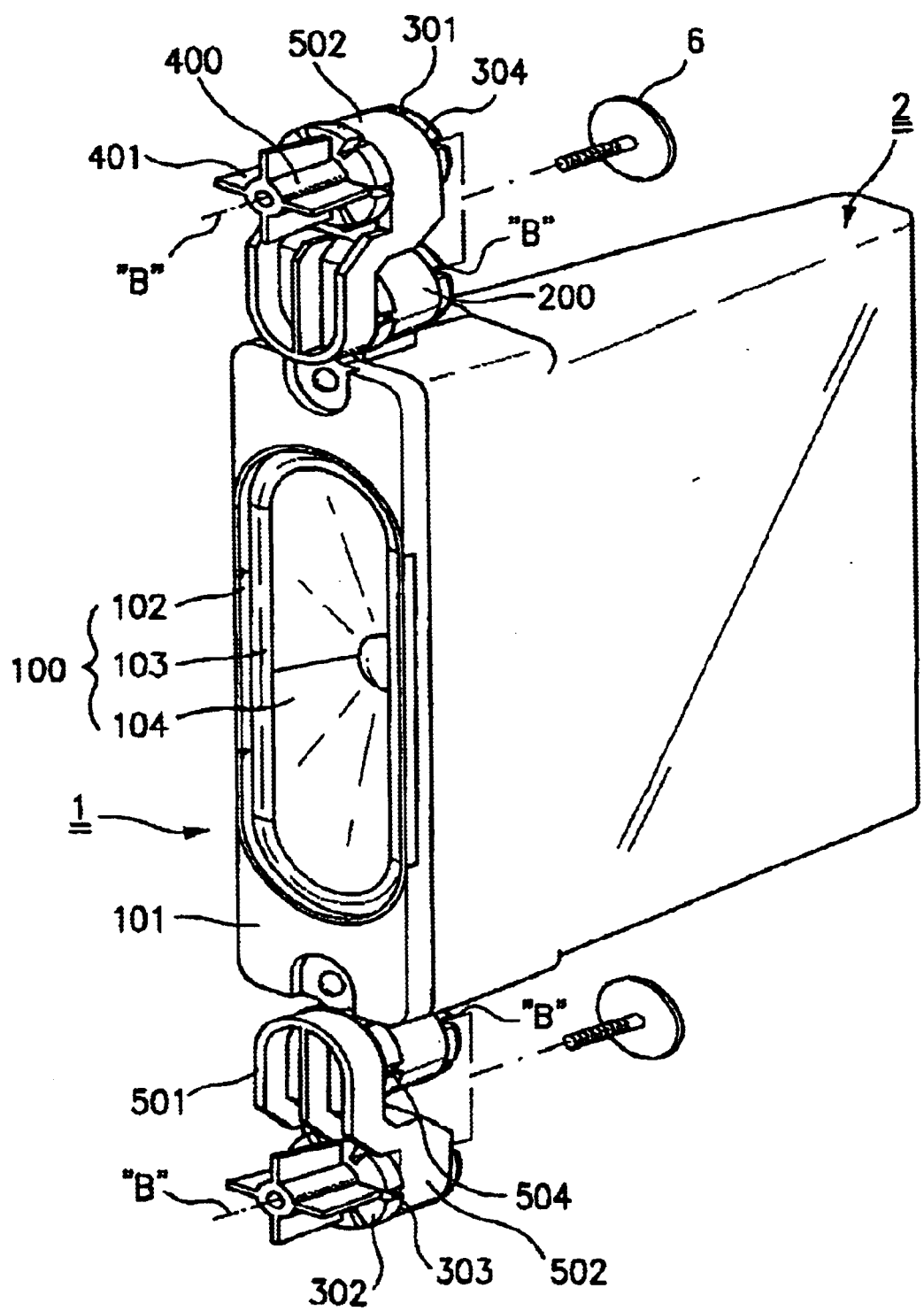
FIG. 6 is a perspective view illustrating the assembled state of FIGS. 4 and 5.

FIG. 4 is an exploded perspective view illustrating a speaker system for a video display equipment having a double damping structure according to a first embodiment of the present invention, FIG. 5 is an exploded perspective view in the another direction of FIG. 4, and FIG. 6 is a perspective view illustrating the assembled state of FIGS. 4 and 5.

Figure 7A:
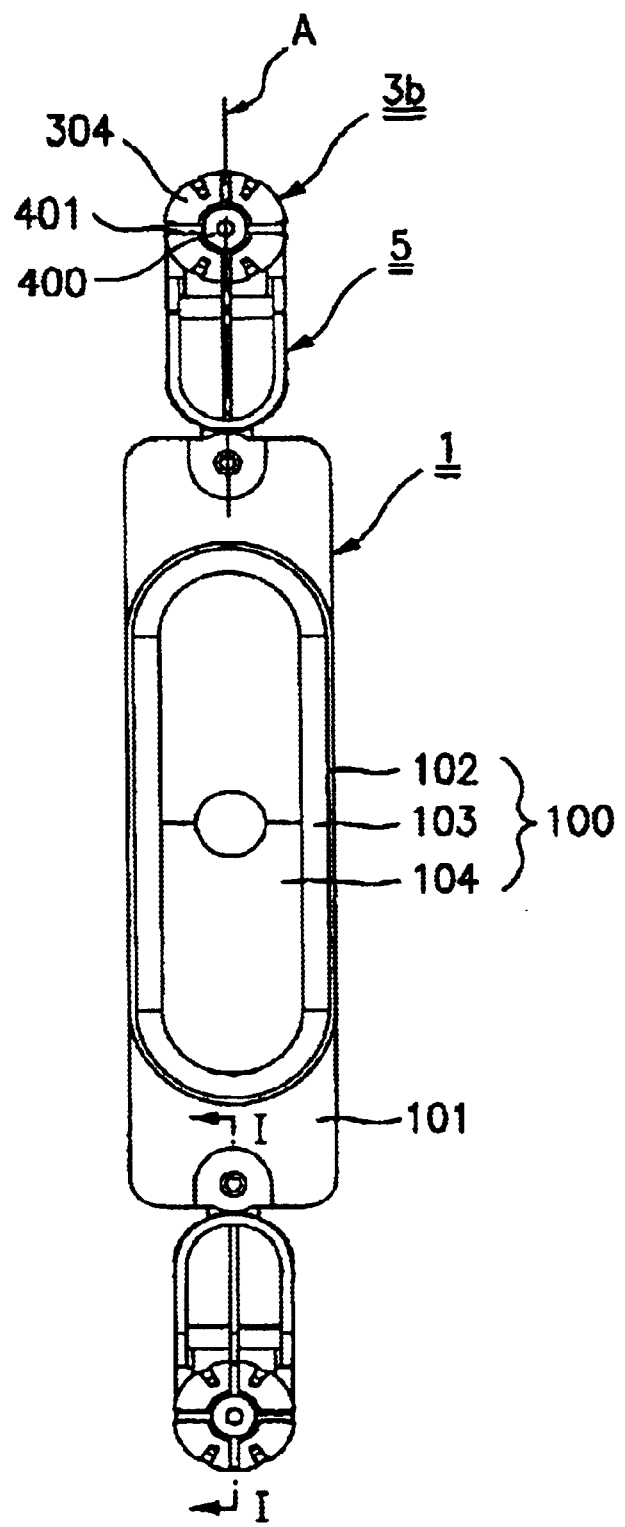
FIG. 7A is a top view of FIG. 6.
Figure 7B:
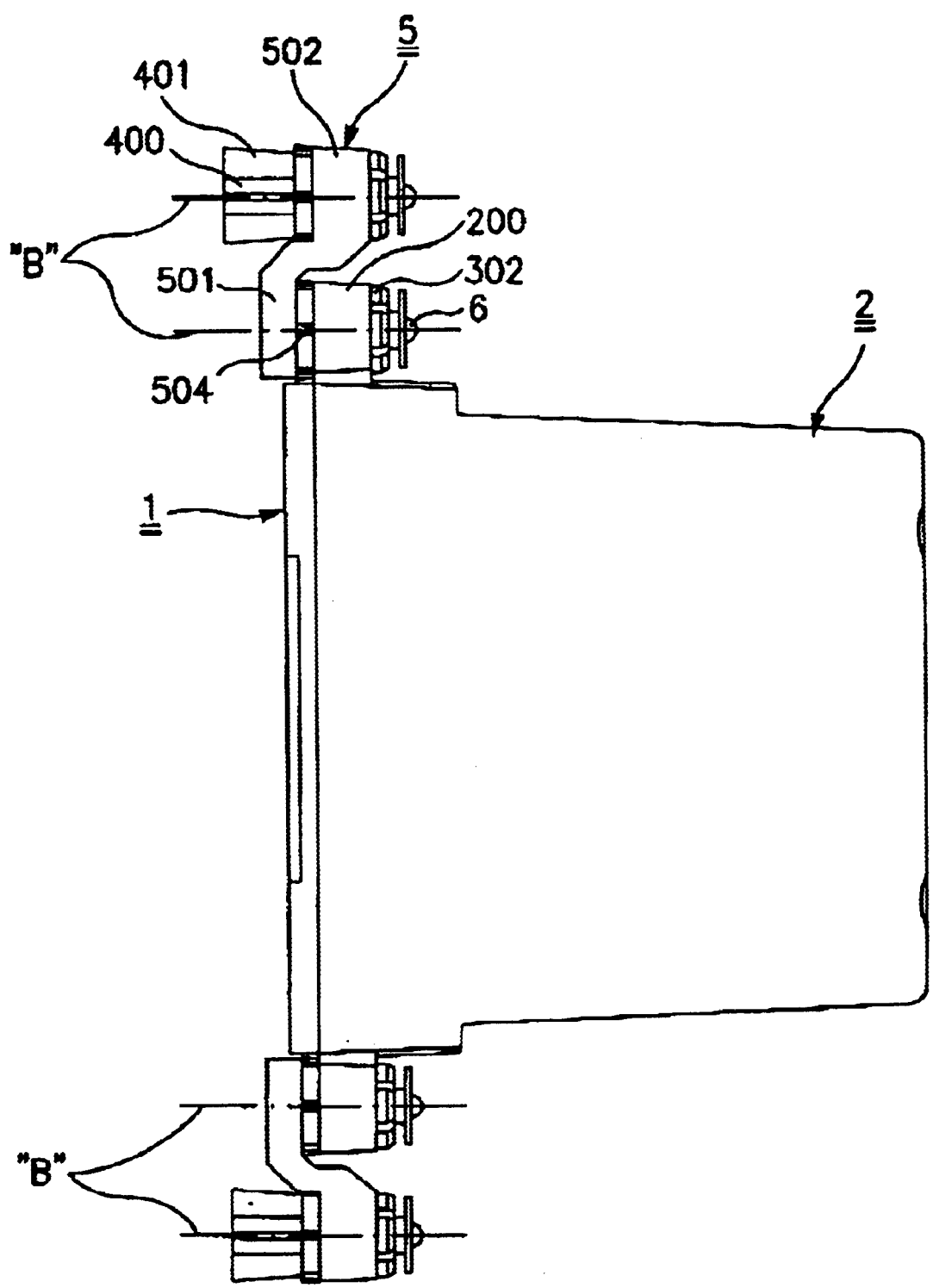
FIG. 7B is a side view of FIG. 6.
Figure 8:
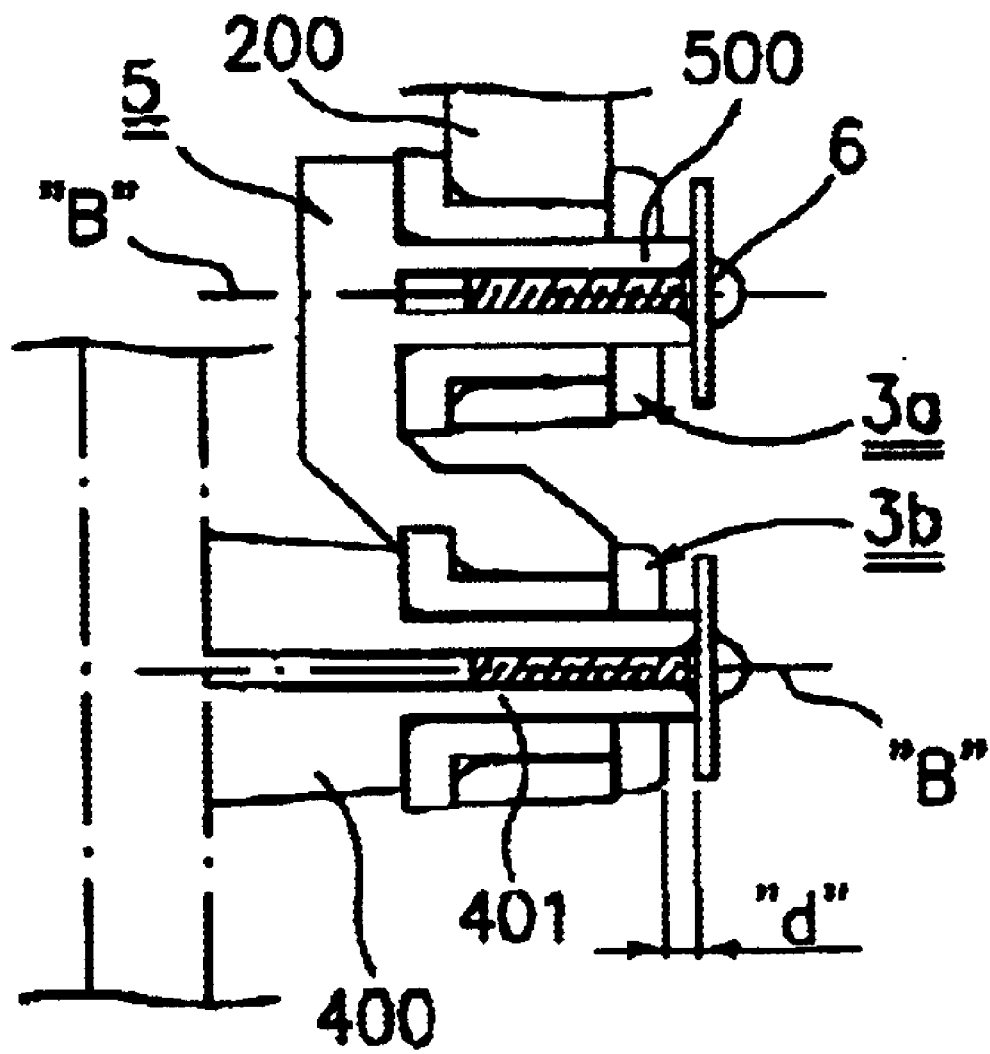
FIG. 8 is a longitudinal sectional view taken along the line I—I of FIG. 7A.

FIG. 7A is a top view of FIG. 6, FIG. 7B is a side view of FIG. 6, and FIG. 8 is a longitudinal sectional view taken along the line I—I of FIG. 7A. In the first embodiment of the present invention, there is provided a multiple damping device in a speaker system for a video display equipment having a cover frame united-type speaker 1 having a cover frame 101 and a speaker 100 for generating sound, as integrated with each other, a back cover 2 assembled at the back portion of the cover frame united-type speaker 1 and installing a damping member fitting portion 200 at the top and bottom portions thereof, respectively, and a damping member 3 adapted to be inserted into a damping member fitting hole 201 to couple the cover frame united-type speaker 1 and the back cover 2 on a cabinet 4 and for damping the vibration generated upon the operation of the speaker and transmitted to the cabinet 4, the multiple damping device including: a multiple damping part adapted to be installed between the cover frame united-type speaker 1 and the cabinet 4 to thereby cut the transmission of the vibration generated upon the operation of the speaker system to the cabinet 4.

At this time, the multiple damping part includes: a first damping member 3a which is inserted into .the damping member fitting hole 201 of the damping member fitting portion 200 on each of the top and bottom ends of the cabinet 4; a connector 5 which is inserted into the inner peripheral surface of the body portion 300 of the first damping member 3a for a multiple connection; and a second damping member 3b which is connected on the top end of the connector 5.

In this case, the first and second damping members 3a, 3b are formed by the same structure and material as each other.

Preferably, the first and second damping members 3a, 3b are made of rubber or silicon material and includes the hollow cylinder type of body portion 300 having a plurality of cutting grooves 301, which pass through the body portion 300, and relief grooves 303 on the circumferential surface of the body portion 300. The cutting grooves 301 and the relief grooves 303 each run along a respective portion of the length of the body portion 300. The body portion 300 includes a flange portion 302 formed in a radial direction on the one end of the body portion 300, and protrusions 304 formed in a radial direction on the other end of the body portion 300 are formed. The cutting grooves 301 pass through the protrusions 304, and terminate before the flange portion 302, and the relief grooves 303 pass through the flange portion 302 and terminate before the protrusions 304.

The connector 5 includes a first body portion 501 adapted for coupling with the first damping member 3a and a second body portion 502 adapted for coupling with the second damping member 3b.

In more detail, the connector 5 is comprised of the first body portion 501 where a damping member combining boss 500 is formed to be inserted into the inner peripheral surface of the body portion 300 of the first damping member 3a and the second body portion 502 being integrated with the first body portion 501 to be disposed on the top portion of the damping member combining boss 500 and for forming a damping member fitting hole 503 into which the second damping member 3b is inserted.

On the other hand, it is preferable that the first and second damping members 3a,3b coupled with the damping member fitting portion 200 formed on the back cover 2 and the connector 5, respectively, are installed to be placed along a line extending along a longitudinal axis of the back cover, as shown by line "A" in FIG. 7A.

In this case, a rotating protection protrusion 202, which is adapted to protect the rotation of the first damping member 3a inserted into the damping member fitting hole 201, is provided on the top and bottom portions of the back edge of the damping member fitting portion 200 formed on the back cover 2, respectively.

The rotating protection protrusion 202 is positioned on the cutting groove 301 formed between the protrusions 304, when the first damping member 3a is assembled on the damping member fitting portion 200.

Upon the insertion of the damping member combining boss 500 into the interior of the body portion 300 of the first damping member 3a, a rotating protection protrusion 504, which is provided on the left and right sides of the damping member combining boss 500 of the first body portion 501, is positioned on the relief grooves 303 formed on the flange portion 302 of the first damping member 3a to thereby protect the rotation of the connector 5.

Also, upon the insertion of the second damping member 3b into the damping member fitting hole 503 of the second body portion 502 of the connector 5, a turning protection portion 505, which is provided on the top and bottom portions of the back edge of the second body portion 502 of the connector 5, respectively, is adapted to be positioned on the cutting groove 301 formed between the protrusions 304 of the second damping member 3b to thereby protect the rotation of the second damping member 3b inserted into the damping member fitting hole 503 of the second body portion 502.

On the other hand, the cabinet 4 is provided on the top portion thereof with a speaker system fitting boss 400 which is coupled with the second damping member 3b by means of a washer based screw 6 and a plurality of positioning ribs 401 for defining the insertion position of the second damping member 3b on the outer peripheral surface of the speaker system fitting boss 400.

At this time, the distance ranged from the positioning ribs 401 to the head of the washer based screw 6 fastened on the speaker system fitting boss 400 is formed to be longer by a predetermined interval (the distance "d" as shown in FIG. 8) than the axial length of the second damping member 3b. In addition, the diameter of the speaker system fitting boss 400 is formed to be substantially smaller than the inside diameter of the body portion 300 of the second damping member 3b. Thereby, the compression of the washer based screw 6 against the second damping member 3b is prevented and the movement of the speaker system coupled with the second damping member 3b is made along the axial direction of the speaker system fitting boss 400.

Under the above construction, an explanation of the assembling process and operation of the multiple damping device of the speaker system according to the first embodiment of the present invention will be given hereinafter.

Firstly, in the state where the cover frame united-type speaker 1 has been assembled with the back cover 2, the first damping member 3a is inserted into the damping member fitting hole 201 of the damping member fitting portion 200 formed on the top and bottom ends of the back cover 2, respectively. In this case, the first damping member 3a can be inserted into the damping member fitting hole 201 as the body portion 300 having the cutting grooves 301 is reduced towards the radial center thereof.

At this time, after the body portion 300 of the first damping member 3a is completely inserted into the damping member fitting hole 201, the first damping member 3a is restored to its original shape by means of an elastic force thereof. As a result, the protrusions 304, which are formed on the other end of the body portion 300 at which the cutting grooves 301 are formed, are positioned on the back edge of the damping member fitting portion 200 to thereby prevent the deviation of the first damping member 3a.

In other words, the protrusions 304 are locked on the back edge of the damping member fitting portion 200 to thereby prevent the deviation of the first damping member 3a towards the axial direction of the damping member fitting portion 200.

When the first damping member 3a is inserted into the damping member fitting portion 200, moreover, the rotating protection protrusion 202, which is formed on the top and bottom portions of the back edge of the damping member fitting portion 200 formed on the back cover 2, respectively, is positioned on the cutting groove 301 formed between the protrusions 304 to thereby protect the rotation of the first damping member 3a inserted into the damping member fitting hole 201.

On the other hand, after the first damping member 3a has been assembled on the damping member fitting portion 200 of the back cover 2, the connector 5 is coupled with the first damping member 3a.

In more detail, the damping member combining boss 500 of the connector 5 is inserted into the inner peripheral surface of the body portion 300 of the first damping member 3a.

At this time, the rotating protection protrusion 504, which is provided on the left and right sides of the damping member combining boss 500 of the first body portion 501, respectively, is positioned on the relief grooves 303 formed on the flange portion 302 of the first damping member 3a to thereby protect the rotation of the connector 5.

Next, after the first damping member 3a has been coupled with the connector 5, the second damping member 3b is inserted into the damping member fitting hole 503 of the second body portion 502 of the connector 5.

In this case, the inserting method of the second damping member 3b is same as in the first damping member 3a.

Under the state where the first and second damping members 3a,3b are coupled through the connector 5 on the speaker system, the body portion 300 of the second damping member 3b is inserted into the speaker system fitting boss 400 on the cabinet 4. At this time, the coupling of the second damping member 3b with the speaker system fitting boss 400 is finished by means of the washer based screw 6.

In more detail, after the body portion 300 of the second damping member 3b has been inserted into the speaker system fitting boss 400 on the cabinet 4, the speaker system is coupled with the speaker system fitting boss 400 by means of the washer based screw 6, as shown in FIG. 6.

It can be appreciated that when compared with the conventional speaker system, the speaker system of the present invention after the completion of the assembly exhibits a higher quality of sound.

Moreover, the multiple damping device of the speaker system for the video display equipment of the present invention can implement the vibration damping operation several times, and therefore, there is an advantage that it can minimize the amount of the vibration transmitted to the cabinet.

At this time, because of the formation of the plurality of cutting grooves 301 and relief grooves 303 on the body portion 300 and the protrusions 304 and flange portion 302 respectively, of the first damping member 3a, each contact area of the front and back edges of the damping member fitting portion 200 with the flange portion 302 and the protrusions 304 of the first damping member 3a is reduced. Thereby, the contact area of the body portion 300 of the first damping member 3a with the inner peripheral surface of the damping member fitting hole 201 of the damping member fitting portion 200 is reduced.

On the other hand, because of the formation of the plurality of cutting grooves 301 and relief grooves 303 on the body portion 300 and the protrusions 304 and the flange portion 302, respectively, of the second damping member 3b, the contact area of the body portion 300 with the speaker system fitting boss 400 on the cabinet 4 is reduced, the contact area of the flange portion 302 of the second damping member 3b with the positioning ribs 401 on the outer peripheral surface of the speaker system fitting boss 400 becomes reduced, and thereby, the contact area of the second damping member 3b with the inner peripheral surface of the damping member fitting hole 503 of the connector 5 is reduced.

Of course, the reduction of the vibration transmission area ensures that the amount of vibration which is transmitted to the cabinet 4 during the operation of speaker can be decreased.

The multiple damping device of the speaker system for the video display equipment according to the present invention is capable of cutting the vibration on the transmission path *thereof several times by means of the damping members 3 having the elastic force and the geometrical shape for reducing the vibration transmission area, to thereby eliminate the screen flickering on the video display equipment.

In short, the speaker system of the present invention is provided with the multiple damping part through which the vibration generated from the speaker is effectively damped to prevent the screen flickering caused due to the vibration of the speaker system, whereby it can raise the wattage of the speaker and lower the reproduction frequency band of the sound wave at the low pass, thus to obtain a high quality of sound.

On the other hand, an explanation of a multiple damping device of a speaker system for a video display equipment according to a second embodiment of the present invention will be discussed with reference to FIGS. 9 to 11.

Figure 9:
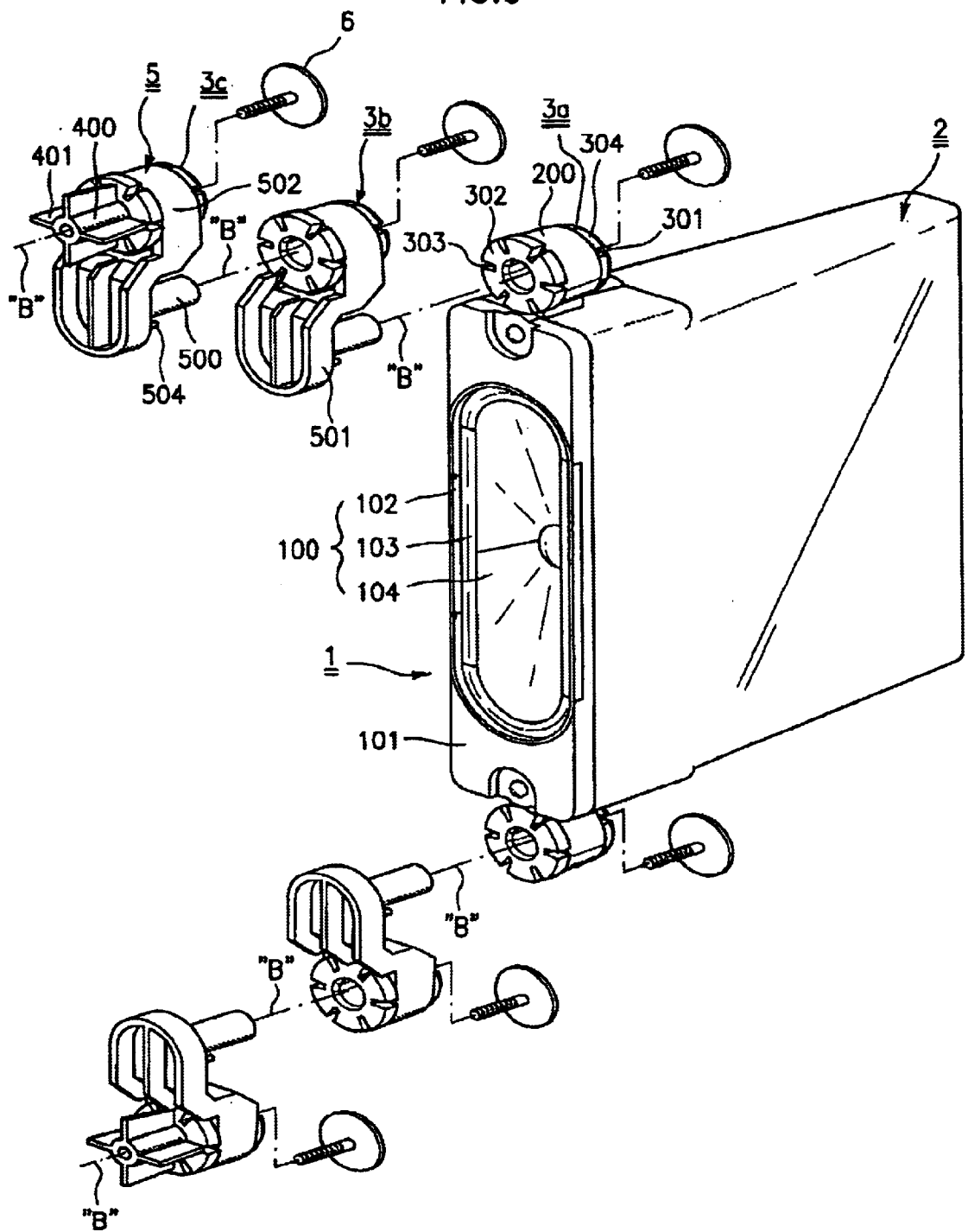
FIG. 9 is an exploded perspective view illustrating a speaker system for a video display equipment having a triple damping structure according to a second embodiment of the present invention.
Figure 10:
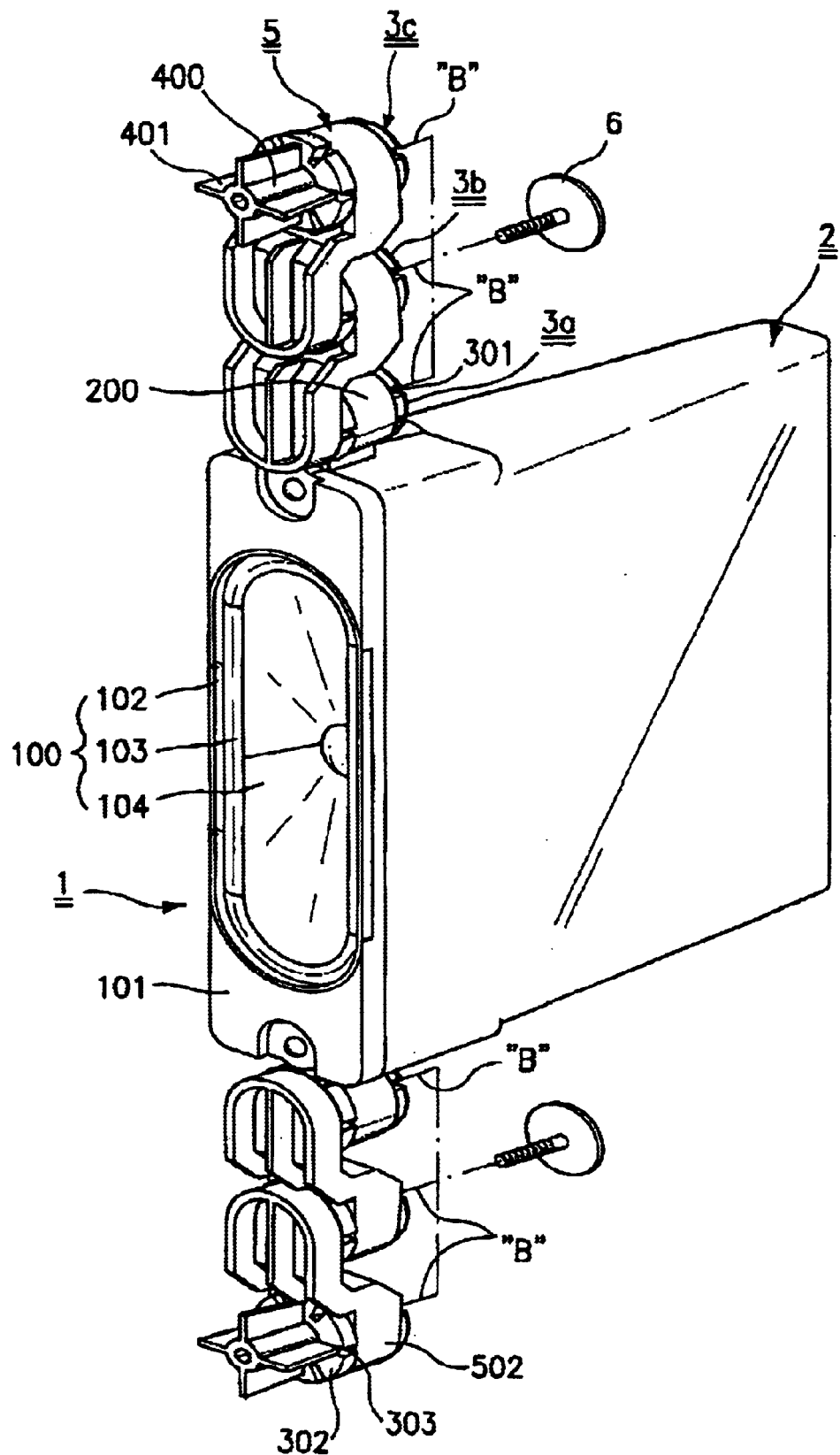
FIG. 10 is a perspective view illustrating the assembled state of FIG. 9; .
Figure 11:
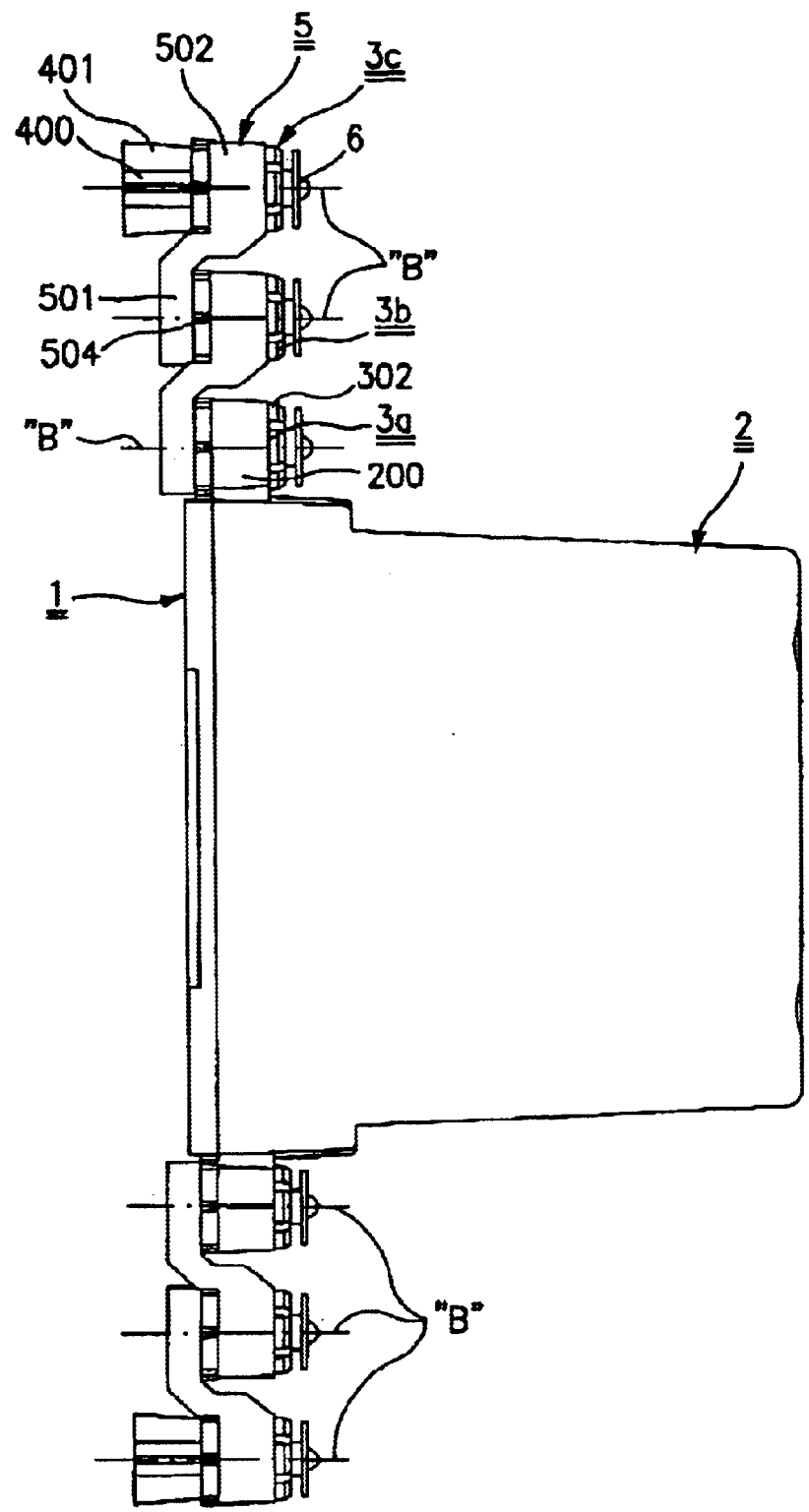
FIG. 11 is a side view of FIG. 10.

FIG. 9 is an exploded perspective view illustrating the speaker system for the video display equipment having a triple damping structure according to the second embodiment of the present invention, FIG. 10 is a perspective view illustrating the assembled state of FIG. 9, and FIG. 11 is a side view of FIG. 10. In the second embodiment, an additional connector 5 and damping member 3c are added.

In the second embodiment, the speaker system can improve the damping performance by cutting the vibration by means of a number of multiple damping paths, whereby it can obtain a higher quality of sound as compared with the first embodiment of the present invention.

If the connector and the damping member as disclosed in the first embodiment of the present invention are each coupled to each other in a multistage manner, the multiple damping device having a fourfold or fivefold vibration cutting path, can be freely embodied.

In other words, the speaker system can have the fourfold or fivefold damping structure, depending upon the height thereof.

As apparent from the foregoing, the multiple damping device of the speaker system for the video display equipment according to the preferred embodiments of the present invention can implement the vibration damping operation on the vibration transmission path several times, whereby it can minimize the amount of the vibration transmitted to the cabinet to achieve the speaker system having a low howling structure where a high quality of sound is produced.

In other words, the speaker system for the video display equipment according to the present invention can include a multiple damping part through which the vibration generated from the speaker is effectively damped to prevent the screen flickering caused due to the vibration of the speaker system, whereby it can raise the wattage of the speaker and lower the reproduction frequency band of the sound wave at the low pass to thereby obtain a high quality of sound.

It will be apparent to those skilled in the art that various modifications and variations can be made in a multiple damping device of a speaker system for a video display equipment according to the present invention without departing from the spirit or scope of the invention. Thus, it is intended that the present invention cover the modifications and variations of this invention provided they come within the scope of the appended claims and their equivalents.

What is claimed is:

1. A damping device for a speaker system for video display equipment having a cover frame united-type speaker for generating sound, a back cover assembled at a back portion of said cover frame united-type speaker and having a damping device fitting portion at,top and bottom portions thereof, respectively, the damping device being adapted to be inserted into a damping device fitting hole formed in the damping device fitting portion to couple said cover frame united-type speaker and said back cover on a cabinet of the video display equipment and for damping the vibration generated upon operation of the speaker and transmitted to said, cabinet, the damping device comprising:

multiple substantially elastic damping members configured to be connected to one another by at least one substantially rigid connector such that central longitudinal axes of the multiple substantially elastic damping member are substantially offset from one another, wherein said damping device is adapted to be installed between said cover frame united-type speaker and said cabinet.

2. The device as defined in claim 1, wherein said multiple substantially elastic damping members comprise:

a substantially elastic first damping member adapted to be inserted into said damping device fitting hole of said damping device fitting portion on each of the top and bottom portions of said back cover wherein the at least one substantially rigid connector is adapted to be inserted into an inner peripheral surface of a body portion of said first damping member, and said multiple substantially elastic damping members comprise a substantially elastic second damping member connected to a top end of said connector.

3. The device as defined in claim 2, wherein each of said first and second damping members comprises:

a hollow cylinder type body portion having a plurality of cutting grooves, and relief grooves on a circumferential surface thereof;

a flange portion formed in a radial direction on a first end of said body portion; and protrusions formed in a radial direction on a second end of said body portion, wherein said cutting grooves pass through said protrusions and said relief grooves pass through said flange portion.

4. The device as defined in claim 2, wherein said first and second damping members comprise a rubber or silicon material.

5. The device as defined in claim 3, wherein said connector comprises:
   a first body portion on which a damping member combining boss is formed and is configured to be inserted into the inner peripheral surface of said body portion of said first damping member; and
   a second body portion integrated with said first body portion and configured to be disposed on a top portion of said damping member combining boss and forming a damping member fitting hole into which said second damping member is inserted.

6. The device as defined in claim 2, wherein said first and second damping members coupled with said damping device fitting portion formed on said back cover and said connector, respectively, are configured to be aligned along a line extending along a longitudinal axis of the back cover.

7. The device as defined in claim 3, wherein said damping device fitting portion forms a first rotating protection protrusion on top and bottom portions of a back edge thereof, respectively, wherein said first rotating protection protrusion is positioned on said cutting grooves formed between said protrusions of said first damping member, when said first damping member is assembled on said damping device fitting portion, for protecting rotation of said first damping member inserted into said damping device fitting hole of said damping device fitting portion.

8. The device as defined in claim 5, wherein said damping member combining boss of said first body portion of said connector forms a second rotating protection protrusion on left and right sides thereof, said second rotating protection protrusion being positioned, upon insertion of said damping member combining boss into an interior of said body portion of said first damping member, on said relief grooves formed on said flange portion of said first damping member to protect rotation of said connector.

9. The device as defined in claim 5, wherein said second body portion of said connector forms a turning protection portion on top and bottom portions of a back edge thereof, respectively, said turning protection portion being positioned, upon insertion of said second damping member into said damping member fitting hole of said second body portion of said connector, on said cutting groove formed between said protrusions of said second damping member, to thereby protect rotation of said second damping member inserted into said damping member fitting hole of said second body portion.

10. The device as defined in claim 2, wherein said cabinet comprises a speaker system fitting boss coupled with said second damping member by means of a washer based screw on a top portion thereof and a plurality of positioning ribs for defining an insertion position of said second damping member on an outer peripheral surface of said speaker system fitting boss.

11. The device as defined in claim 10, wherein a distance from said positioning ribs to a head of said washer based screw fastened on said speaker system fitting boss is configured to be longer than an axial length of said second damping member, and a diameter of said speaker system fitting boss is configured to be substantially smaller than all inside diameter of said body portion of said second damping member, whereby compression of said washer based screw against said second damping member is prevented and movement of said speaker system coupled with said second damping member is made along an axial direction of said speaker system fitting boss.

12. The device as defined in claim 1, wherein the multiple substantially elastic damping members respectively connected by each of the at least one substantially rigid connector are disposed substantially adjacent to one another.

13. A damping device for a speaker system for video display equipment having a cover frame united-type speaker for generating sound, a back cover assembled at the back portion of said cover frame united-type speaker and having a damping device fitting portion at top and bottom portions thereof, respectively, the damping device being adapted to be inserted into a damping device fitting hole to couple said cover frame united-type speaker and said back cover on a cabinet and for damping the vibration generated upon the operation of the speaker and transmitted to said cabinet, the damping device comprising:
   a multiple damping part adapted to be installed between said cover frame united-type speaker and said cabinet, wherein said multiple damping part comprises:
      a first damping member adapted to be inserted into said damping device fitting hole of said damping device fitting portion on each of the top and bottom ends of said cabinet;
      a connector adapted to be inserted into an inner peripheral surface of a body portion of said first damping member for a multiple connection, wherein said connector comprises a first body portion where a damping member combining boss is formed to be inserted into the inner peripheral surface of said body portion of said first damping member, and a second body portion being integrated with said first body portion to be disposed on a top portion of said damping member combining boss and forming a damping member fitting hole into which said second damping member is inserted; and
      a second damping member connected on the top end of said connector.

14. A multiple damping device for a speaker system for video display equipment having a cover frame united-type speaker for generating sound, a back cover assembled at the back portion of said cover frame united-type speaker and having a damping device fitting portion at top and bottom portions thereof, respectively the damping member being adapted to be inserted into a damping device fitting hole to couple said cover frame united-type speaker and said back cover on a cabinet and for damping the vibration generated upon the operation of the speaker and transmitted to said cabinet, the damping device comprising:
   a multiple damping part adapted to be installed between said cover frame united-type speaker and said cabinet to thereby cut transmission of vibration generated upon operation of said speaker system to said cabinet, wherein said multiple damping part comprises:
      a first damping member adapted to be inserted into said damping device fitting hole of said damping device fitting portion on each of top and bottom ends of said cabinet;
      a connector adapted to be inserted into an inner peripheral surface of a body portion of said first damping member for a multiple connection; and
      a second damping member connected on a top end of said connector, wherein said cabinet comprises a speaker system fitting boss coupled with said second damping member by means of a washer based screw on a top portion thereof and a plurality of positioning ribs for defining an insertion position of said second damping member on an outer peripheral surface of said speaker system fitting boss.

15. A damping device, comprising:

multiple substantially elastic damping members; and at least one substantially rigid connector, wherein at least two of said multiple substantially elastic damping members are configured to be connected to one another in series by one of said at least one substantially rigid connectors such that central longitudinal axes of the at least two of said multiple substantially elastic damping members are substantially offset from one another, and wherein a first elastic damping member of said at least two multiple substantially elastic damping members is configured to be connected to a speaker enclosure and a second elastic damping member of said at least two multiple substantially elastic damping members is configured to be connected to a cabinet enclosing video display equipment, wherein said multiple substantially elastic damping members each comprises:

a body portion comprising a hollow cylinder with an inner surface and an outer surface;

a flange portion connected to a first end of said body portion, wherein said flange portion protrudes radially outward from said outer surface; and multiple protrusions connected to a second end of said body portion, wherein said multiple protrusions protrude radially outward from said outer surface.

16. The damping device of claim 15, wherein said multiple substantially elastic damping members each further comprises:

multiple cutting grooves, wherein said cutting grooves comprise a slit between said outer surface and said inner surface of said body portion, and said cutting grooves begin at said second end of said body portion passing between said protrusions and terminate before said first end of said body portion; and multiple relief grooves, wherein said relief grooves comprise a slot on said outer surface of said body portion, and said relief grooves begin at said first end of said body portion passing through said flange portion and terminate before said second end of said body portion.

17. The damping device of claim 15, comprising:

three substantially elastic damping members; and two substantially rigid connectors.

18. The damping device of claim 15, wherein the multiple substantially elastic damping members respectively connected by each of the at least one substantially rigid connector are disposed substantially adjacent to one another.

19. A damping device, comprising:

multiple substantially elastic damping members; and at least one substantially rigid connector, wherein at least two of said multiple substantially elastic damping members are configured to be connected to one another in series by one of said at least one substantially rigid connectors such that central longitudinal axes of the at least two of said multiple substantially elastic damping members are substantially offset from one another, and wherein a first elastic damping member of said at least two multiple substantially elastic damping members is configured to be connected to a speaker enclosure and a second elastic damping member of said at least two multiple substantially elastic damping members is configured to be connected to a cabinet enclosing video display equipment, wherein said at least one substantially rigid connector comprises:

an elongated body with a first body portion at a first end of said elongated body and a second body portion at a second end of said elongated body, wherein said first body portion comprises a damping member fitting boss configured to engage the first substantially elastic damping member along an inner surface thereof and said second body portion comprises a damping member fitting hole configured to engage the second substantially elastic damping member along an outer surface thereof.

20. The damping device of claim 19, wherein said at least one substantially rigid connector further comprises:

at least one turning protection portion attached to said second body portion, wherein said turning protection portion is configured to engage a cutting groove of said second substantially elastic damping member; and at least one rotation protection protrusion attached to said first body portion, wherein said rotation protection protrusion is configured to engage a relief groove passing through a flange of said first substantially elastic damping member.

21. A damping device for a speaker system for video display equipment having a cover frame united-type speaker for generating sound, a back cover assembled at a back portion of said cover frame united-type speaker and having a damping device fitting portion at top and bottom portions thereof, respectively, the damping device being adapted to be inserted into a damping device fitting hole to couple said cover frame united-type speaker and said back cover on a cabinet and for damping the vibration generated upon operation of the speaker and transmitted to said cabinet, the damping device comprising:

multiple substantially elastic damping members configured to be connected to one another by at least one substantially rigid connector, wherein said damping device is adapted to be installed between said cover frame united-type speaker and said cabinet, wherein said multiple substantially elastic damping members comprise:

a substantially elastic first damping member adapted to be inserted into said damping device fitting hole of said damping device fitting portion on each of the top and bottom portions of said back cover, wherein the at least one substantially rigid connector is adapted to be inserted into an inner peripheral surface of a body portion of said first damping member, and said multiple substantially elastic damping members comprise a substantially elastic second damping member connected to a top end of said connector, wherein each of said first and second damping members comprises:

a hollow cylinder type body portion having a plurality of cutting grooves, and relief grooves on a circumferential surface thereof, a flange portion formed in a radial direction on a first end of said body portion; and protrusions formed in a radial direction on a second end of said body portion, wherein said cutting grooves pass through said protrusions and said relief grooves pass through said flange portion.

22. The device as defined in claim 21, wherein said connector comprises:

a first body portion on which a damping member combining boss is formed and is configured to be inserted into the inner peripheral surface of said body portion of said first damping member; and a second body portion integrated with said first body portion and configured to be disposed on atop portion of said damping member combining boss and forming a damping member fitting hole into which said second damping member is inserted.

23. The device as defined in claim 22, wherein said damping member combining boss of said first body portion of said connector forms a second rotating protection protrusion on left and right sides thereof, said second rotating protection protrusion being positioned, upon insertion of said damping member combining boss into an interior of said body portion of said first damping member, on said relief grooves formed on said flange portion of said first damping member to protect rotation of said connector.

24. The device as defined in claim 22, wherein said second body portion of said connector forms a turning protection portion on top and bottom portions of a back edge thereof, respectively, said turning protection portion being positioned, upon insertion of said second damping member into said damping member fitting hole of said second body portion of said connector, on said cutting groove formed between said protrusions of said second damping member, to thereby protect rotation of said second damping member inserted into said damping member fitting hole of said second body portion.

25. The device as defined in claim 21, wherein said damping device fitting portion forms a first rotating protection protrusion on top and bottom portions of a back edge thereof, respectively, wherein said first rotating protection protrusion is positioned on said cutting grooves formed between said protrusions of said first damping member, when said first damping member is assembled on said damping device fitting portion, for protecting rotation of said first damping member inserted into said damping device fitting hole of said damping device fitting portion.

26. A damping device for a speaker system for video display equipment having a cover frame united-type speaker for generating sound, a back cover assembled at a back portion of said cover frame united-type speaker and having a damping device fitting portion at top and bottom portions thereof, respectively, the damping device being adapted to be inserted into a damping device fitting hole formed in the damping device fitting portion to couple said cover frame united-type speaker and said back cover on a cabinet of the video display equipment and for damping the vibration generated upon operation of the speaker and transmitted to said cabinet, the damping device comprising:
multiple substantially elastic damping members configured to be connected to one another by at least one substantially rigid connector, wherein said damping device is adapted to be installed between said cover frame united-type speaker and said cabinet, wherein said multiple substantially elastic damping members comprise:
a substantially elastic first damping member adapted to be inserted into said damping device fitting hole of said damping device fitting portion on each of the top and bottom portions of said back cover, wherein the at least one substantially rigid connector is adapted to be inserted into an inner peripheral surface of a body portion of said first damping member, and said multiple substantially elastic damping members comprise a substantially elastic second damping member connected to a top end of said connector, wherein said first and second damping members coupled with said damping device fitting portion formed on said back cover and said connector, respectively, are configured to be aligned along a line extending along a longitudinal axis of the back cover.

27. The damping device of claim 26, wherein the multiple substantially elastic damping members respectively connected by each of the at least one substantially rigid connector are disposed substantially adjacent to one another.

28. A damping device for a speaker system for video display equipment having a cover frame united-type speaker for generating sound, a back cover assembled at a back portion of said cover frame united-type speaker and having a damping device fitting portion at top and bottom portions thereof, respectively, the damping device being adapted to be inserted into a damping device fitting hole to couple said cover frame united-type speaker and said back cover on a cabinet and for damping the vibration generated upon operation of the speaker and transmitted to said cabinet, the damping device comprising:
multiple substantially elastic damping members configured to be connected to one another by at least one substantially rigid connector, wherein said damping device is adapted to be installed between said cover frame united-type speaker and said cabinet, and wherein said multiple substantially elastic damping members comprise:
a substantially elastic first damping member adapted to be inserted into said damping device fitting hole of said damping device fitting portion on each of the top and bottom portions of said back cover wherein the at least one substantially rigid connector is adapted to be inserted into an inner peripheral surface of a body portion of said first damping member, and said multiple substantially elastic damping members comprise a substantially elastic second damping member connected to a top end of said connector, and wherein said cabinet comprises a speaker system fitting boss coupled with said second damping member by means of a washer based screw on a top portion thereof and a plurality of positioning ribs for defining an insertion position of said second damping member on an outer peripheral surface of said speaker system fitting boss.

29. The device as defined in claim 28, wherein, a distance from said positioning ribs to a head of said washer based screw fastened on said speaker system fitting boss is configured to be longer than an axial length of said second damping member, and a diameter of said speaker system fitting boss is configured to be substantially smaller than an inside diameter of said body portion of said second damping member, whereby compression of said washer based screw against said second damping member is prevented and movement of said speaker system coupled with said second damping member is made along all axial direction of said speaker system fitting boss.

30. A damping device, comprising:
multiple substantially elastic damping members; and
at least one substantially rigid connector, comprising:
an elongated body with a first body portion at a first end of said elongated body and a second body portion at a second end of said elongated body, wherein said first body portion comprises a damping member fitting boss configured to engage a first substantially elastic damping member along an inner surface thereof and second body portion comprises a damping member fitting hole configured to engage a second substantially elastic damping member along an outer surface thereof, wherein at least two of said multiple substantially elastic damping members are configured to be connected to one another by one of said at least one substantially rigid connectors, and wherein the first substantially elastic damping member is configured to be connected to a speaker enclosure and the second substantially elastic damping member is configured to be connected to a cabinet enclosing video display equipment.

31. The device as defined in claim 30, at least one turning protection portion attached to said second body portion, wherein said turning protection portion is configured to engage a cutting groove of said second substantially elastic damping member; and at least one rotation protection protrusion attached to said first body portion, wherein said rotation protection protrusion is configured to engage a relief groove passing through a flange of said first substantially elastic damping member.

32. A damping device, comprising:

multiple substantially elastic damping members, wherein said multiple substantially elastic damping members each comprises:
  a body portion comprising a hollow cylinder with an inner surface and an outer surface;
  a flange portion connected to a first end of said body portion, wherein said flange portion protrudes radially outward from said outer surface;
  multiple protrusions connected to a second end of said body portion, wherein said multiple protrusions protrude radially outward from said outer surface;
  multiple cutting grooves, wherein said cutting grooves comprise a slit between said outer surface and said inner surface of said body portion, and said cutting grooves begin at said second end of said body portion passing between said protrusions and terminate before said first end of said body portion; and
  multiple relief grooves, wherein said relief grooves comprise a slot on said outer surface of said body portion, and said relief grooves begin at said first end of said body portion passing through said flange portion and terminate before said second end of said body portion; and at least one substantially rigid connector, wherein at least two of said multiple substantially elastic damping members are configured to be connected to one another in series by one of said at least one substantially rigid connectors, and wherein a first elastic damping member of said at least two multiple substantially elastic damping members is configured to be connected to a speaker enclosure and a second elastic damping member of said at least to multiple substantially elastic damping members is configured to be connected to a cabinet enclosing video display equipment, wherein the multiple substantially elastic damping members respectively connected by each of the at least one substantially rigid connector are disposed substantially adjacent to one another.

33. A damping device, comprising:

multiple substantially elastic damping members;

at least one substantially rigid connector;

a speaker enclosure; and a video equipment cabinet, wherein at least two of said multiple substantially elastic damping members are connected to one another in series by at least one of said substantially rigid connectors such that central longitudinal axes of the at least two of said multiple substantially elastic damping members are substantially offset from one another, and wherein a first elastic damping member of said at least two of said multiple substantially elastic damping member is connected to said speaker enclosure and a second elastic damping member of said at least two of said multiple substantially elastic damping member is connected to said cabinet enclosing video display equipment, wherein the multiple substantially elastic damping members respectively connected by each of the at least one substantially rigid connector are disposed substantially adjacent to one another.

\* \* \* \* \*